(12) United States Patent
Loh et al.

(10) Patent No.: US 9,377,954 B2
(45) Date of Patent: Jun. 28, 2016

(54) SYSTEM AND METHOD FOR MEMORY ALLOCATION IN A MULTICLASS MEMORY SYSTEM

(71) Applicant: Advanced Micro Devices, Inc., Sunnyvale, CA (US)

(72) Inventors: Gabriel Loh, Bellevue, WA (US); Mitesh Meswani, Austin, TX (US); Michael Ignatowski, Austin, TX (US); Mark Nutter, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/273,751

(22) Filed: May 9, 2014

(65) Prior Publication Data

US 2015/0324131 A1    Nov. 12, 2015

(51) Int. Cl.
*H01L 29/00*    (2006.01)
*G06F 3/06*    (2006.01)

(52) U.S. Cl.
CPC ............ *G06F 3/0608* (2013.01); *G06F 3/0631* (2013.01); *G06F 3/0685* (2013.01)

(58) Field of Classification Search
CPC .... G06F 3/0608; G06F 3/0631; G06F 3/0685
USPC .......... 257/499, 349; 711/148, 151, 158, 114
See application file for complete search history.

(56) References Cited

U.S. PATENT DOCUMENTS

| | | | |
|---|---|---|---|
| 2007/0043908 A1* | 2/2007 | Diefendorff | ................... 711/137 |
| 2008/0005208 A1 | 1/2008 | Vaswani et al. | |
| 2011/0107042 A1 | 5/2011 | Herron | |
| 2012/0246403 A1* | 9/2012 | McHale et al. | ............... 711/114 |

OTHER PUBLICATIONS

Patryk Kaminski, "NUMA Aware Heap Memory Manager", Advanced Micro Devices, Inc., 2009, 16 pages.
Maged M. Michael, "Scalable Lock-Free Dynamic Memory Allocation", PLDI'04, Jun. 9-11, 2004, 12 pages.
"libhugetlbfs", Accessed May 6, 2014, 1 page. <http://libhugetlbfs.sourceforge.net>.
Jim Gray et al., "The 5 Minute Rule for Trading Memory for Disc Accesses and the 5 Byte Rule for Trading Memory for CPU Time", Tandem Computers, Technical Report TR86.1, May 1985, 16 pages.
Jim Gray et al., "The 5 Minute Rule Ten Years Later, and Other Computer Storage Rules of Thumb", SIGMOD Record, vol. 26, No. 4, Dec. 1997, 6 pages.
U.S. Appl. No. 14/206,512, filed Mar. 12, 2014, entitled "Address-Partitioned Multi-Class Physical Memory System".
Written Opinion corresponding to PCT/US2015/029369 mailed Jul. 24, 2015, 7 pages.

* cited by examiner

*Primary Examiner* — Tu-Tu Ho

(57) ABSTRACT

A system for memory allocation in a multiclass memory system includes a processor coupleable to a plurality of memories sharing a unified memory address space, and a library store to store a library of software functions. The processor identifies a type of a data structure in response to a memory allocation function call to the library for allocating memory to the data structure. Using the library, the processor allocates portions of the data structure among multiple memories of the multiclass memory system based on the type of the data structure.

18 Claims, 7 Drawing Sheets

US 9,377,954 B2

SYSTEM AND METHOD FOR MEMORY ALLOCATION IN A MULTICLASS MEMORY SYSTEM

GOVERNMENT LICENSE RIGHTS

This invention was made with government support under Prime Contract Number DE-AC52-07NA27344, Subcontract Number B600716 awarded by the Department of Energy (DOE). The Government has certain rights in this invention.

BACKGROUND

1. Field of the Disclosure

The present disclosure relates generally to memory systems and more particularly to memory systems employing multiple memories.

2. Description of the Related Art

Processing systems may implement multiple types or levels of memory (e.g. combinations of volatile and non-volatile memory architectures or in-package and external memory) to satisfy a variety of design requirements. For example, multilevel memory may be used to take advantage of increased bandwidth, capacity, and expandability by combining memories that offer one or more of these features. Allocation of data structures among the memories of a multilevel memory system having a unified memory address space can impact the system performance. Conventionally, the operating system or the hardware of the system determines how to allocate data structures among the memories of the multilevel memory system based on static, predefined conditions or based on a seemingly arbitrary allocation. This often can result in an inefficient or ineffective utilization of the different memories of the multilevel memory system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate example systems and techniques for allocating memory for data structures of a software program in a processing system employing a multiclass memory system. In some embodiments, the processing system comprises the multiclass memory system and a processor having processing cores and a memory controller. The multiclass memory system comprises a plurality of memories of at least two different memory classes (each class defining one or both of a level and a type) that share a unified memory address space. In response to the processor executing a memory allocation function call (e.g., malloc) to a library to allocate memory to a data structure, the library identifies the type of the data structure, and based on the type of data structure, an operating system allocates portions of the data structure among multiple memories of the multiclass memory system. For example, in some embodiments, the operating system allocates portions of data structure among the memories such that more frequently searched or accessed portions of the data structure are allocated to a memory with a faster access time, while less frequently searched or accessed portions of the data structure are allocated to a memory comprising a slower access time. In some embodiments the function call comprises a plurality of parameters, such that when the processor executes the function call, the operating system allocates the portions of the data structure based on the parameters. In another embodiment, the function call comprises an indicator of a memory level of the multiclass memory system, such that when the processor executes the function call comprising the indicator, the operating system allocates an identified portion of the data structure to the indicated memory level. The described techniques allow for more efficient allocation of portions of the data structure based on how the processing cores are likely to search or access the portions of the data structure, improving performance and reducing power consumption.

Figure 1:
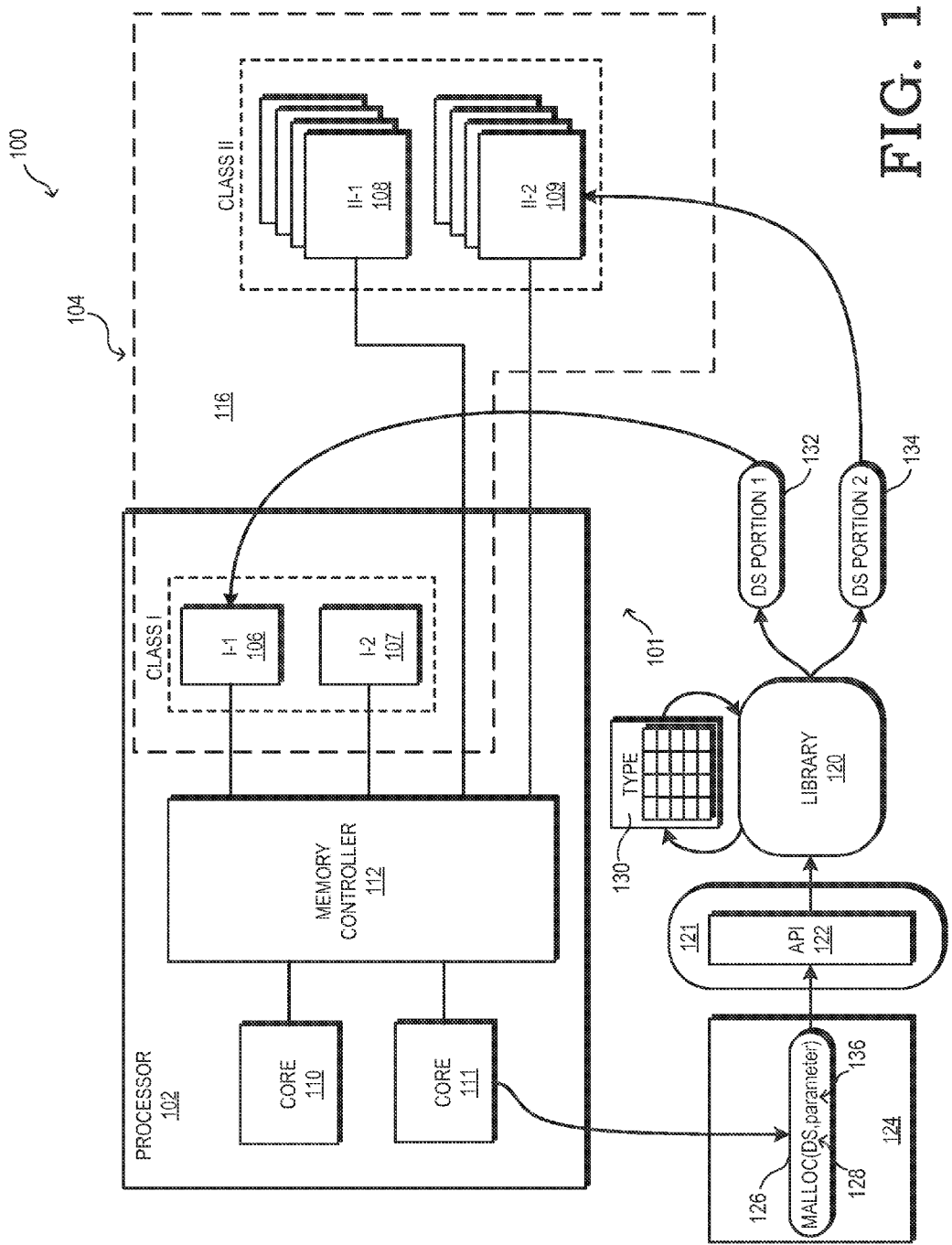
FIG. 1 is a block diagram of a processing system employing a multiclass memory system in accordance with some embodiments.

FIG. 1 illustrates a block diagram of a processing system 100 employing a multiclass memory system 101 in accordance with some embodiments. The processing system 100 comprises a processor 102 and a memory hierarchy 104 comprising a plurality of memories belonging to two or more different classes, each class defining one or both of a level and a type. The memory level is based on the locational access speed of the memory. For example, between in-package memory and outside-package memory (or "on-chip" and "off-chip" memories), the access speed of the in-package memory will generally be faster. In at least one embodiment, the multiclass memory system 101 is a multilevel memory system. The memory type is based on the particular architecture of the memory, and each memory may comprise any of a variety of memory types, for example, lower granularity divisions, such as volatile memory vs. non-volatile memory or dynamic random access memory (DRAM) vs. static random access memory (SRAM) vs. phase change memory vs. memristor memory, or higher granularity divisions, such as different architectures within the same type of general memory architecture, such as double data rate type three synchronous dynamic random access memory (DDR3 SDRAM), graphics double data rate version five synchronous dynamic random access memory (GDDR5 SDRAM), and low power double data rate synchronous dynamic random access memory (LPDDR SDRAM).

Each of the memories 106, 107, 108, 109 within the unified memory address space 116, classified into its respective memory class (denoted class "I" and "II") based on its level, type, or both. As such, in some embodiments the memories 106, 107, 108, 109 may be classified such that memories within the same class share one or more of the same level, the same type, and other operational characteristics, such as access time, bandwidth, data transfer rate, and the like. To illustrate, the memories 106, 107 may be classified as class I as they both are at the same level (e.g., in-package) and the memories 108, 109 may be classified as class II as they both are at the same level (e.g., outside-package), or the memories 106, 107 may be classified as class I as they both implement, for example, DRAM architectures whereas the memories 108, 109 may be classified as class II as they both implement, for example, SRAM architectures, and the like.

While the memory hierarchy 104 is illustrated in the embodiment of FIG. 1 as two in-package memories 106, 107 and two outside-package memories 108, 109, other embodiments may employ any number of memories spanning at least two classes. Additionally, in some embodiments the memory hierarchy 104 may comprise any combination of in-package and outside-package memories, including all outside-package memory and all in-package memories. Some embodiments of the memory hierarchy 104 may implement die-stacked memory to increase capacity or otherwise take advantage of multiple memories while maintaining a smaller overall footprint. Die-stacked memory may be implemented in a vertical stacking arrangement, using through-silicon via (TSV) or other vertical interconnect technologies, or in a horizontal arrangement, whereby the memory dies are "stacked" horizontally relative to the processor or one another, such that they are connected via an interposer. In the embodiment of FIG. 1, the in-package memories 106, 107 are illustrated as being of the same class (denoted class "I"), and the outside-package memories 108, 109 are illustrated as being of the same class (denoted class "II"). Further, the multiclass memory system 101 of other embodiments may comprise memories of different levels, different types, or a combination thereof. For example, in at least one embodiment, the multiclass memory system 101 comprises memories all of the same level but of different types.

The processor 102 comprises processor cores 110, 111, and a memory controller 112. While the illustrated embodiment depicts a memory controller 112 implemented at the processor 102, in other embodiments the memory controller 112 may be implemented elsewhere, for example, at a memory interface of a stacked memory device implementing one or more of the memories 108, 109. Further, in some embodiments, the processor 102 comprises more than one memory controller 112. The memory controller 112 retrieves data from the memories 106, 107, 108, 109 in response to a memory address request based on an address space allocation. Thus, in the illustrated embodiment, the memory controller 112, and the processing system 100, treats the memories 106, 107, 108, 109 as a single, flat, unified memory address space 116. As a result, the different classes (I, II) of memories are still logically part of the same level of the traditional memory hierarchy, in that they are all part of the same main or system memory, and are therefore all accessible through the same, unified, flat physical memory address space.

Conventionally, the operating system or the hardware of the system determines how to allocate data structures among the memories of a multiclass memory system based on static, predefined conditions or based on a seemingly arbitrary allocation. Since these conventional approaches cannot take advantage of higher-level (e.g. software, data structure, algorithm, etc.) semantic or domain-specific knowledge of how data will be accessed, frequently accessed portions of data structures are often allocated to lower performance memories, leading to decreased efficiency and overall degraded performance.

In contrast, in the illustrated embodiment, a library store comprises a library 120 which provides data structures, algorithms, and other services through an Application Programming Interface (API) 122 to a programmer or other user, such that the back-end implementation of the library 120 dynamically handles memory allocation decisions. This allows for allocation decisions based on higher-level semantic or domain-specific knowledge of how data will be accessed. For example, in some embodiments, the library 120 may use a multilevel-memory-aware software interface to selectively allocate data structures to the memories 106, 107, 108 109 of the multiclass memory system 101, or it may maintain its own pools of memory pages from the different memory levels and explicitly handle the allocation of the data structure to these pages as it sees fit. The library 120 may be any library that transparently manages the memory allocation, for example, the C++ standard template library (STL), Java standard libraries, C# and the .NET framework, custom libraries, domain-specific libraries, and the like. Based on the memory allocation decision of the library 120, an operating system 121 of the processing system 100 allocates a unified, flat address space to the memories 106, 107, 108, 109.

In the illustrated embodiment, the processor core 111 executes a software program 124 comprising a memory allocation function call 126 to the library 120 to allocate memory to a data structure 128. The software program 124 accesses the library 120 via the API 122. In at least one embodiment, the library 120 references a data structure type table 130 to determine how to allocate the data structure 128 among the memories 106, 107, 108, 109 of the multiclass memory system 101 based on the type of the data structure 128 to be allocated. The data structure type table 130 may comprise static allocation rules, may maintain heuristics updated based on memory access history or other information, or the like. The data structure 128 may be any of a variety of data structures, for example, a linked list, a map structure, a binary tree, a graph structure, an array, a tuple, and the like. Based on the type of the data structure 128, the library 120 may decide that the operating system 121 is to allocate different portions of the data structure 128 to different memories of the multiclass memory system 101, in an effort to maintain efficient performance of the processor 100.

For example, in the illustrated embodiment, the library 120 indicates that the operating system 121 is to allocate a first portion 132 of the data structure 128 to memory 106, and a second portion 134 of the data structure 128 to memory 109. The library 120 may make such a decision based on the dynamic access patterns of the type of data structure (e.g., more frequently used portions should be allocated to memories with faster access times), the amount of memory available in each memory 106, 107, 108, 109 or class (e.g., as much of the data structure 128 as possible should be allocated to the memories with faster access times as long as they have available memory space), a combination of these, and the like. In at least one embodiment, the portions 132, 134 represent the metadata and data, respectively of the data structure 128, such that the metadata portion 132 is allocated to a first set of memories 106 of the multiple memories 106, 107, 108, 109 and the data portion 134 is allocated to a second set of memories 109 of the multiple memories 106, 107, 108, 109. In the illustrated example, the first portion 132 (such as the metadata of the data structure 128) is allocated to memory 106 of class I that provides faster access than the memory 109 to which the second portion 134 (such as the data of the data structure 128) is allocated. Such an allocation may be made to improve performance of the processor 100 because the metadata is smaller than the data of the data structure 128, because the metadata is accessed more frequently than the data, a combination of these, and the like.

While the illustrated embodiment depicts the library 120 dividing the data structure 128 into two portion 132, 134 to be allocated among two memories 106, 109, respectively, other embodiments may divide the data structure 128 into more portions, allocate the data structure among more memories, or allocate the data structure 128 without dividing it into portions. Further, in some embodiments the library 120 allocates the portions 132, 134 of the data structure 128 to specific memory classes (I, II) for the operating system 121 to distribute subsections of the portions among the memories of a specific class (e.g., if portion 132 is allocated to class I, the operating system 121 distributes subsections of portion 132 among memories 106, 107 of class I) evenly, arbitrarily, or based on one or more heuristics. Further, portions and subsections may represent any portion or subsection of the data structure 128, and need not be contiguous.

In some embodiments, the library 120 may provide any of a variety of interfaces or hooks, which may be optional, to allow the programmer to provide input or direction on how the data structure 128 is to be allocated among the memories 106, 107, 108, 109 of the multiclass memory system 101. For example, in at least one embodiment, the library 120 allows the programmer or other user to provide a parameter 136 with the memory allocation function call 126, such that the operating system 121 allocates portions 132, 134 of the data structure 128 among multiple memories 106, 109 of the multiclass memory system 101 based on the parameter 136 (or plurality of parameters). The parameter 136 may indicate, for example, the type of the data structure 128, how the data structure 128 is to be divided into its portions 132, 134, how many memories 106, 107, 108, 109 are to be used, which memories 106, 107, 108, 109 are to be used, which classes (I, II) are to be used, one or more limits (e.g., only allocate the metadata separately from the data for the first n lines), or the like.

In at least one embodiment, library 120 comprises a domain-specific library. Some examples of domain-specific libraries are routines that are specialized for basic linear algebra, such as basic linear algebra subprograms (BLAS), automatically tuned linear algebra software (ATLAS), portable, extensible toolkit for scientific computation (PETSc), and application markup language (APPML). ATLAS for instance is a self-optimizing library that searches the optimization parameter space (blocking factor, unrolling) and, implementation algorithms to generate highly optimized hardware-specific linear algebra routines. An example of such libraries is the use of blocking for matrix-matrix multiply. One implementation includes configuring the library 120 to assume different blocking mechanisms for each level of the memory hierarchy 104 and to move data from the lower levels to the upper levels which also correspond to the innermost loop. Such routines assume access to DRAM is a fixed cost, but in a system comprising multiple classes of memories, the algorithms would have to be refactored for the faster memory. Sparse matrix vector multiplies (SpMV) is another example of an algorithm that is important in the performance of many high performance computing (HPC) applications. SpMV are generally represented using compressed row format (CSR). In CSR the nonzero row elements are stored in a values array, the column indices are stored in a column array, and the index into column array for the start of each row is stored in a row index array. In one embodiment, the library 120 allocates storage of the index arrays in the faster memory (e.g., class I) and the large values array in slower memory (e.g., class II) to allow for faster searching. In addition to static optimization for a multiclass memory system 101, these libraries can insert profile guided dynamic optimization to move components of data structures between different memory levels during execution.

Figure 2:
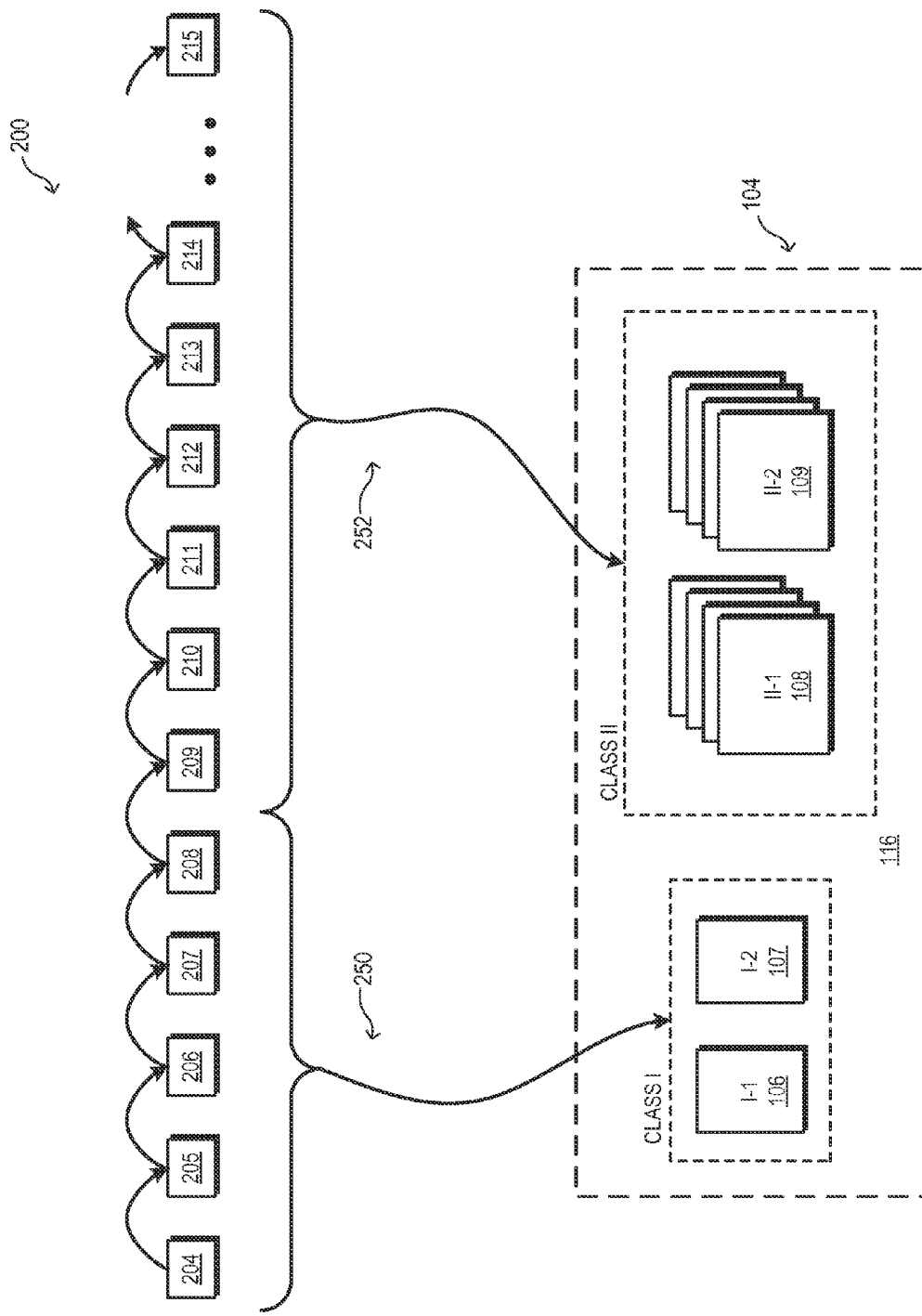
FIG. 2 is a diagram illustrating an example memory allocation for a linked list data structure in accordance with some embodiments.

FIG. 2 is a diagram illustrating an example memory allocation by the processing system 100 of FIG. 1 for a linked list data structure 200 in accordance with some embodiments. The linked list data structure 200 comprises nodes 204-215 which are linked, such that node 204 comprises a link or other reference to node 205, which comprises a link to node 206, which comprises a link to node 207, and so on, until final node 215. A memory access to retrieve data from one or more nodes requires traversing each node of the linked list data structure 200 from the first node 204 until the desired node. For example, a memory access of node 207, would require the processor 102 to start with the first node 204, follow its link to node 205, follow its link to node 206, and finally follow its link to node 207. Conventional memory allocation arbitrarily allocates the various nodes 204-215 among the memories 106, 107, 108, 109 of the multiclass memory system 101, such that nodes 204, 205, 206, 207 may be stored in separate memories 106, 107, 108, 109, and a memory access of node 207 would require each of the separate memories 106, 107, 108, 109 to be accessed as the processor 102 traverses the nodes 204, 205, 206, 207 of the linked list. These conventional approaches introduce inefficiencies as multiple memories may need to be accessed multiple times to reach a node, and frequently accessed data may be stored at memories with slower access times. In contrast, in the illustrated example, the operating system 121 allocates portions of the linked list data structure 200 based on the access order of the nodes 204-215 such that segments having nodes that are earlier in the access order of the linked list data structure 200 are allocated to memories with faster access times, while segments having nodes later in the access order of the linked list data structure 200 are allocated to memories with slower access times.

Responsive to the memory allocation function call 126 to the library 120 via the API 122 for allocating memory to the data structure 128, the library 120 identifies the data structure 128 as the linked list data structure 200. Based on the type table 130, one or more parameters 136 provided by the program 124, or the data structure 128 itself, the library 120 determines how the linked list data structure 200 is to be divided into portions and allocated among the multiclass memory system 101. In the illustrated embodiment, two portions are depicted, the first representing an initial segment 250 of the linked list data structure 200, and the second representing a final segment 252 of the linked list data structure 200. Since the nodes 204-208 of the initial segment 250 will be accessed at least as frequently (and likely more frequently) than the nodes 209-215 of the final segment 252, the operating system 121 allocates the initial segment 250 to memory class I comprising memories 106, 107 with relatively faster access times and the final segment 252 to memory class II comprising memories 108, 109 with relatively slower access times. As a result, a memory access of node 207 will only require accessing one or more memories 106, 107 of class I, while a memory access of node 213 will require accessing one or more memories 106, 107 of class I for nodes 204-208 as well as one or more memories 108, 109 of class II for nodes 209-213. Since nodes 204-208 are accessed from memories 106, 107 having relatively faster access times, the processor 102 is able to traverse the initial segment 250 of the list relatively quickly, allowing for more efficient memory accesses of the linked list data structure 200. This linked list memory allocation technique may be applied to any type of linked list, for example, a singly linked list, doubly linked list, and the like. The linked list data structure 200 may or may not be allocated contiguously within a given memory.

While the illustrated example depicts the linked list data structure 200 divided into two portions representing the initial segment 250 and the final segment 252 allocated to two different memory classes (I, II), the library 120 may determine any number of portions of the linked list data structure 200, and may allocate the portions to any number of memory classes or individual memories. Further, in some embodiments, the library 120 may make its allocation decisions based on one or more parameters 136 provided by the program 124. For example, the parameter 136 may indicate how to divide the linked list data structure 200 into portions, how many portions should be created, which memory classes (I, II) to use, which memories 106, 107, 108, 109 to use, which portions of the linked list data structure 200 should be allocated to which memories 106, 107, 108, 109 or which classes (I, II), the initial node 204 of the linked list data structure 200, or the like.

Figure 3:
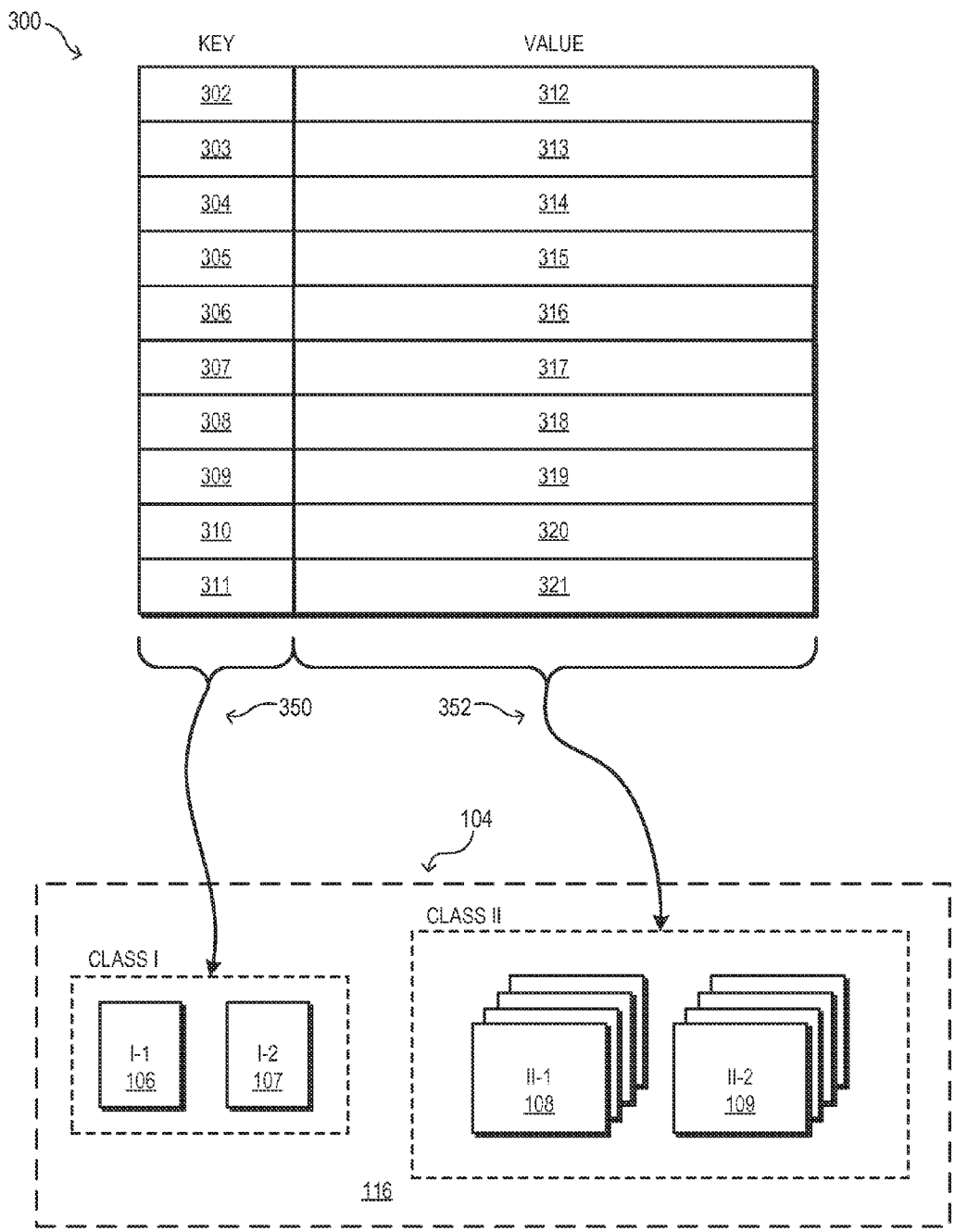
FIG. 3 is a diagram illustrating an example memory allocation for a map data structure in accordance with some embodiments.

FIG. 3 is a diagram illustrating an example memory allocation by the processing system 100 of FIG. 1 for a map data structure 300 in accordance with some embodiments. The map data structure 300 comprises a plurality of keys 302-311 bound to a plurality of values 312-321, such that a memory access requires a lookup operation of the key 305 to retrieve the corresponding value 315. Conventional memory allocation arbitrarily allocates the various keys 302-311 and values 312-321 among the memories 106, 107, 108, 109 of the multiclass memory system 101. These conventional approaches introduce inefficiencies as multiple memories may need to be accessed multiple times to reach a value (e.g., due to linear chaining or other hash conflict handling techniques), and frequently accessed data may be stored at memories with slower access times. In contrast, in the illustrated example, the operating system 121 allocates portions of the map data structure 300, such that the keys 302-311 of the map data structure 300 are allocated to memories with faster access times, while the corresponding values 312-321 of the map data structure 300 are allocated to memories with slower access times.

Responsive to the memory allocation function call 126 to the library 120 via the API 122 for allocating memory to the data structure 128, the library 120 identifies the data structure 128 as the map data structure 300. Based on the type table 130, one or more parameters 136 provided by the program 124, or the data structure 128 itself, the library 120 determines how the map data structure 300 is to be divided into portions and allocated among the multiclass memory system 101. In the illustrated embodiment, two portions are depicted, the first representing a key portion 350 of the map data structure 300, and the second representing a value portion 352 of the map data structure 300. The operating system 121 allocates the key portion 350 to memory class I comprising memories 106, 107 with relatively faster access times and the value portion 352 to memory class II comprising memories 108, 109 with relatively slower access times. As a result, the key lookup operations may proceed quickly, and then the memory controller 112 may retrieve the corresponding value from a memory with slower access times. The processing system 100 will further realize the efficiencies of such a memory allocation in situations involving multiple lookups. Further, allocation to a memory having a slower access time but an increased capacity may be beneficial if the map data structure 300 comprises one or more values 312-321 of a relatively large size. This map data structure memory allocation technique may be applied to any type of map or other associate array data. The keys 302-311 and values 312-321 of the map data structure 200 may or may not be allocated contiguously within a given memory.

While the illustrated example depicts the map data structure 300 divided into two portions representing the key portion 350 and the value portion 352 allocated to two different memory classes (I, II), the library 120 may determine any number of portions of the map data structure 300, and may allocate the portions to any number of memory classes or individual memories. Further, in some embodiments, the library 120 may make its allocation decisions based on one or more parameters 136 provided by the program 124. For example, the parameter 136 may indicate how to divide the map data structure 300 into portions, how many portions should be created, which memory classes (I, II) to use, which memories 106, 107, 108, 109 to use, which portions of the map data structure 300 should be allocated to which memories 106, 107, 108, 109 or which classes (I, II), or the like.

Figure 4:
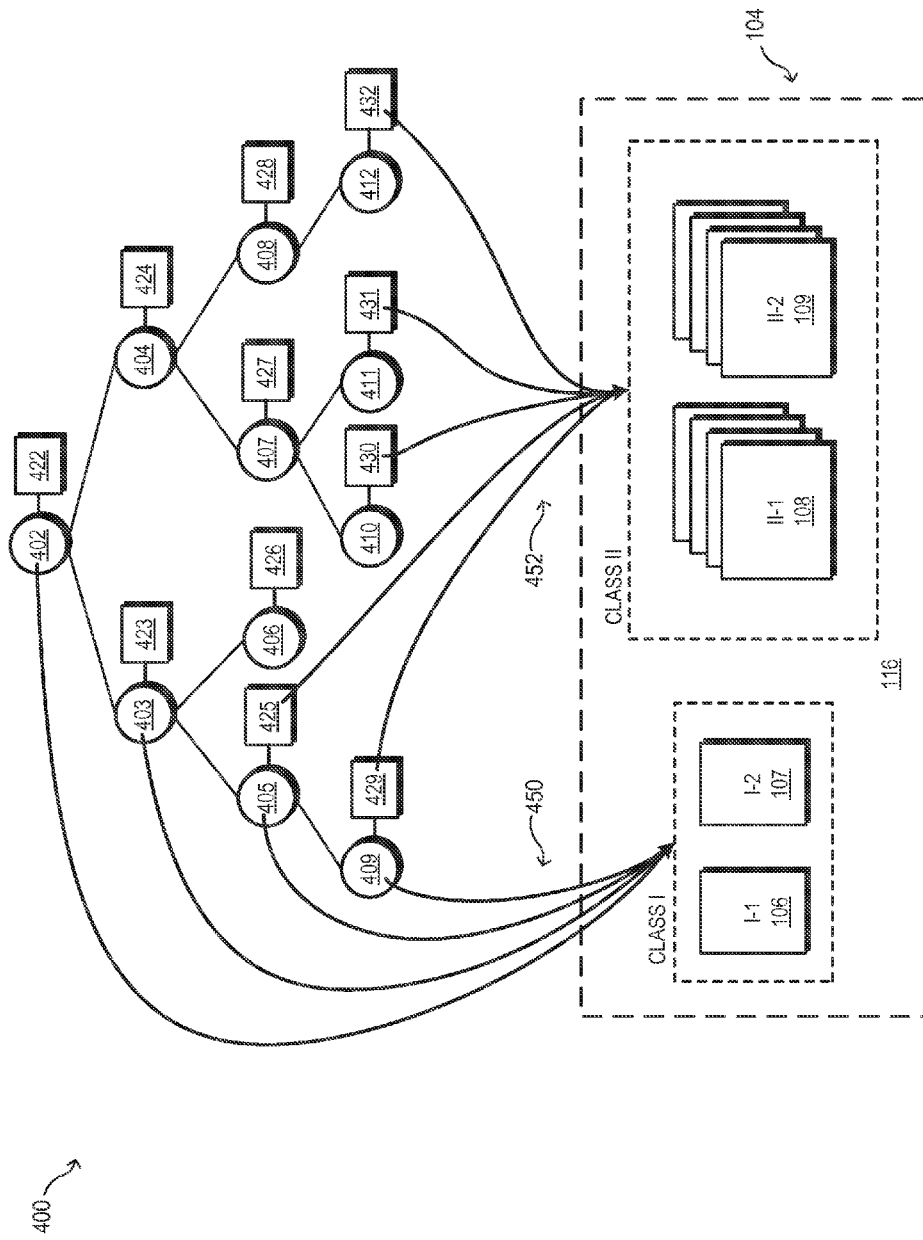
FIG. 4 is a diagram illustrating an example memory allocation for a binary tree data structure in accordance with some embodiments.

FIG. 4 is a diagram illustrating an example memory allocation by the processing system 100 of FIG. 1 for a binary tree data structure 400 in accordance with some embodiments. The binary tree data structure 400 comprises a plurality of nodes, with each node storing node metadata 402-412 (e.g., information regarding node ID, keys, pointers, or links to other nodes) and node data 422-432. A memory access to retrieve node data, such as node data 426 typically requires traversal of multiple nodes of the binary tree data structure 400 in accordance with any of a variety of traversal schemes. For example, in the case of an in-order traversal scheme, a memory access to retrieve node data 426 would require that the processor 102 traverse the binary tree 400 beginning with node metadata 409, then node metadata 405, node metadata 403 and finally node metadata 406 to retrieve node data 426. In the case of a level-order traversal scheme, a memory access to retrieve node data 426 would require that the processor 102 traverse the binary tree 400 beginning with the root node metadata 402, then node metadata 403, node metadata 404, node metadata 405, and finally node metadata 406 to retrieve node data 426.

Conventional memory allocation arbitrarily allocates the node metadata 402-412 and the node data 422-432 among the memories 106, 107, 108, 109 of the multiclass memory system 101, such that nodes that will be traversed consecutively according to the traversal scheme may be allocated to separate memories, such that transversal of the binary tree data structure 400 may require each of the separate memories 106, 107, 108, 109 to be accessed. These conventional approaches introduce inefficiencies as multiple memories may need to be accessed multiple times to reach the requested node, and frequently accessed portions of the binary tree data structure 400 may be stored at memories with slower access times. In contrast, in the illustrated example, the operating system 121 allocates portions of the binary tree data structure 400, such that the node metadata 402-412 of the binary tree data structure 400 is allocated to memories with faster access times, while the corresponding node data 422-432 of the binary tree data structure 400 is allocated to memories with slower access times.

Responsive to the memory allocation function call 126 to the library 120 via the API 122 for allocating memory to the data structure 128, the library 120 identifies the data structure 128 as the binary tree data structure 400. Based on the type table 130, one or more parameters 136 provided by the program 124, or the data structure 128 itself, the library 120 determines how the binary tree data structure 400 is to be divided into portions and allocated among the multiclass memory system 101. In the illustrated embodiment, two portions are depicted, the first representing a node metadata portion 450 of the binary tree data structure 400, and the second representing a node data portion 452 of the binary tree data structure 400. For ease of illustration, the node metadata portion 450 and node data portion 452 only indicate select nodes of the binary tree data structure 400, however the node metadata portion 450 represents all of the node metadata 402-412 and the node data portion 452 represents all of the node data 422-432.

The operating system 121 allocates the node metadata portion 450 to memory class I comprising memories 106, 107 with relatively faster access times and the node data portion 452 to memory class II comprising memories 108, 109 with relatively slower access times. As a result, the traversal of the binary tree data structure 400 may proceed quickly since the node metadata 402-412 will be accessed from one or more memories 106, 107 with faster access times, and then the memory controller 112 may retrieve the requested node data from a memory with slower access times. Further, allocation to a memory having a slower access time but an increased capacity may be beneficial to nodes of the binary tree data structure 400 comprising node data 422-432 of a relatively large size.

In another embodiment, the operating system 121 allocates portions of the binary tree data structure 400 based on the traversal order of the nodes, such that segments having nodes that are earlier in the traversal order according to the traversal scheme of the binary tree data structure 400 are allocated to memories with faster access times, while segments having nodes later in the traversal order according to the traversal scheme of the binary tree data structure 400 are allocated to memories with slower access times. For example, in the context of a level-order traversal scheme, since the node metadata of higher levels (i.e., closer to the root node) will be accessed at least as frequently (and likely more frequently) than the node metadata of lower levels (i.e., closer to the branches), the operating system 121 may allocate the first three levels (comprising node metadata 402-408) to memory class I comprising memories 106, 107 with relatively faster access times and the branch level (included metadata 409-412) to memory class II comprising memories 108, 109 with relatively slower access times. As a result, a memory access of node data 427 will only require accessing one or more memories 106, 107 of class I, while a memory access of node data 430 will require accessing one or more memories 106, 107 of class I for node metadata 402-408 as well as one or more memories 108, 109 of class II for node metadata 409, 410. Since node metadata 402-408 is accessed from memories 106, 107 having relatively faster access times, the processor 102 is able to traverse the first three levels relatively quickly, allowing for more efficient memory accesses of the binary tree data structure 400.

These binary tree data structure memory allocation technique may be applied to any type of graph data structure, for example, a ternary tree structure, a B+ tree structure, a directed acyclic graph (DAG), or the like. Further, the node metadata 402-412 and the node data 422-432 may or may not be allocated contiguously within a given memory. While the illustrated example depicts the binary tree data structure 400 divided into two portions representing the node metadata portion 450 and the node data portion 452 allocated to two different memory classes (I, II), the library 120 may determine any number of portions of the binary tree data structure 400, and may allocate the portions to any number of memory classes or individual memories. Further, in some embodiments, the library 120 may make its allocation decisions based on one or more parameters 136 provided by the program 124. For example, the parameter 136 may indicate how to divide the binary tree data structure 400 into portions, how many portions should be created, which memory classes (I, II) to use, which memories 106, 107, 108, 109 to use, which portions of the binary tree data structure 400 should be allocated to which memories 106, 107, 108, 109 or which classes (I, II), the traversal scheme, or the like.

Figure 5:
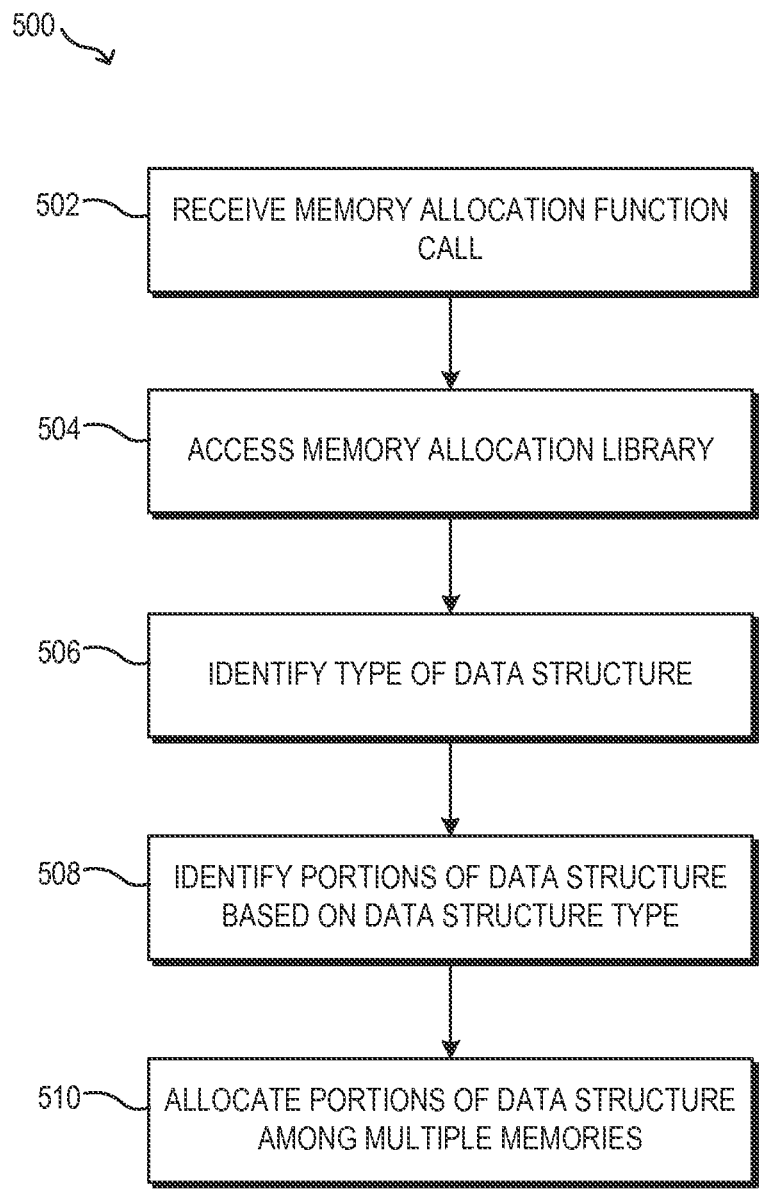
FIG. 5 is a flow diagram illustrating a method for memory allocation for a data structure among memories of a multiclass memory system in accordance with some embodiments.

FIG. 5 is a flow diagram illustrating an example method 500 for memory allocation for a data structure among memories of a multiclass memory system in accordance with some embodiments. For ease of reference, the method 500 is described below in the example context of the multiclass memory system 101 of FIG. 1. The method 500 initiates at block 502, whereby the processing system 100 receives the memory allocation function call 126 when the processor core 111 executes the software program 124 comprising the memory allocation function call 126 to the library 120 to allocate memory to a data structure 128.

At block 504, the processing system 100 accesses the library 120 via the API 122. The library 120 provides data structures, algorithms, and other services through the API 122 to the programmer or other user, such that the back-end implementation of the library 120 dynamically handles memory allocation decisions. This allows for allocation decisions based on higher-level semantic or domain-specific knowledge of how data will be accessed. For example, in some embodiments, the library 120 may use a multilevel-memory-aware software interface to selectively allocate data structures to the memories 106, 107, 108 109 of the multiclass memory system 101, or it may maintain its own pools of memory pages from the different memory levels and explicitly handle the allocation of the data structure to these pages as it sees fit. The library 120 may be any library that transparently manages the memory allocation, for example, the C++ standard template library (STL), Java standard libraries, C# and the .NET framework, custom libraries, domain-specific libraries, and the like.

At block 506, the library 120 identifies the type of the data structure 128 based on, for example, one or more parameters 136 included with the memory allocation function call, heuristics, or the like. In at least one embodiment, the library 120 references the data structure type table 130 to determine information related to allocation of the data structure 128 among the memories 106, 107, 108, 109 of the multiclass memory system 101. For example, the library 120 may use the type table 130 to identify portions of the data structure 128 in accordance with block 508. The library 120 identifies portions 132, 132 of the data structure 128 based on the data structure type. In some embodiments, the library 120 identifies portions 132, 134 of the data structure 128 based on one or more parameters 136 provided by the program 124. The portions may be determined based on access frequency, data size, or the like. The library 120 indicates to the operating system 121 how the data structure 128 is to be allocated based on the portions 132, 134.

At block 510, the operating system 121 allocates the portions 132, 134 of the data structure among multiple memories 106, 109 of the multiclass memory system 101. The allocation may be based on the dynamic access patterns of the type of data structure (e.g., more frequently used portions should be allocated to memories with faster access times), the amount of memory available in each memory 106, 107, 108, 109 or class (e.g., as much of the data structure 128 as possible should be allocated to the memories with faster access times as long as they have available memory space), a combination of these, and the like. In at least one embodiment, the portions 132, 134 represent the metadata and data, respectively of the data structure 128, such that the metadata portion 132 is allocated to a first set of memories 106 of the multiple memories 106, 107, 108, 109 and the data portion 134 is allocated to a second set of memories 109 of the multiple memories 106, 107, 108, 109. Such an allocation may be made to improve performance of the processor 100 because the metadata is smaller than the data of the data structure 128, because the metadata is accessed more frequently than the data, a combination of these, and the like.

Figure 6:
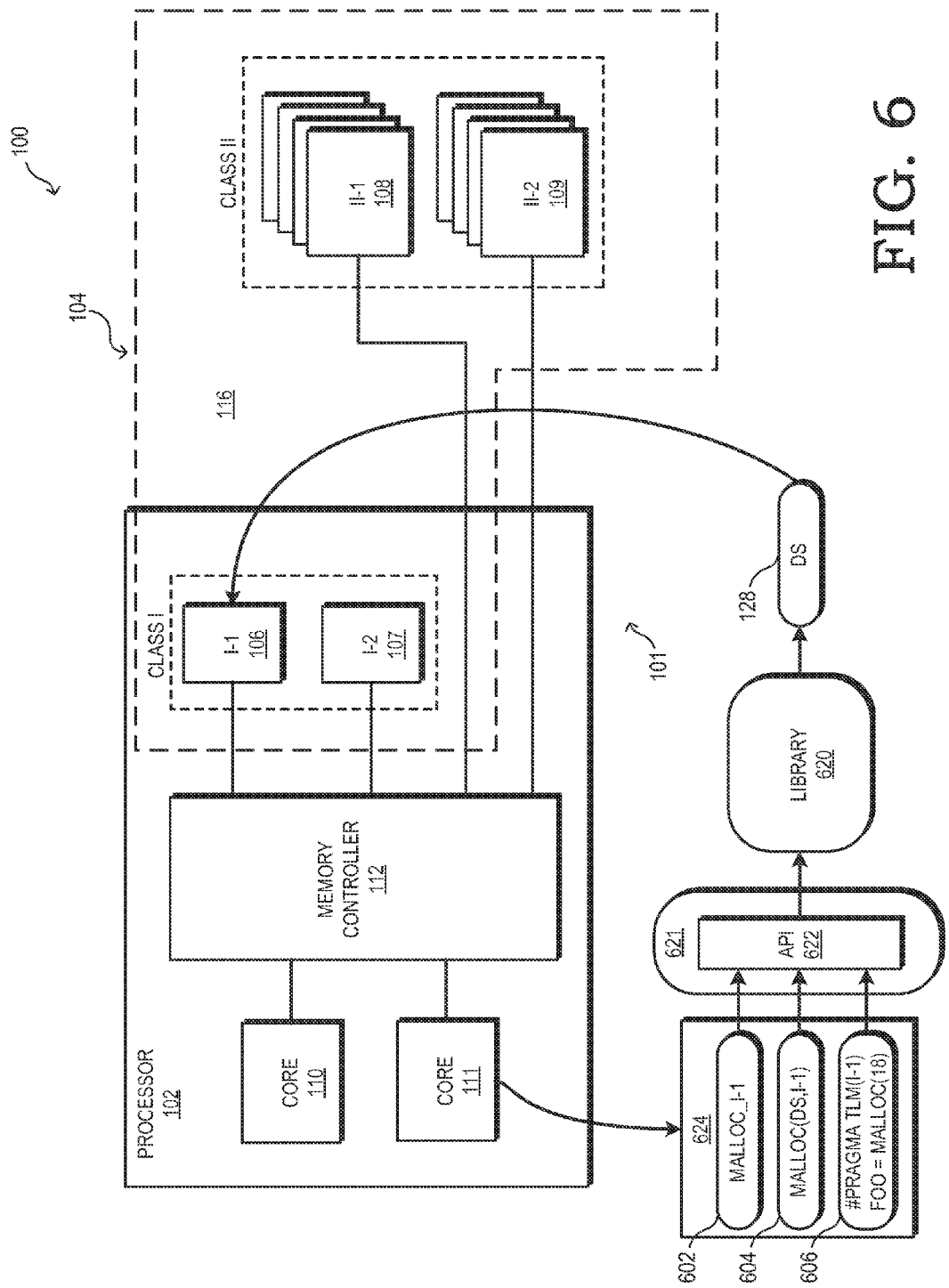
FIG. 6 is a block diagram of a processing system employing a multiclass memory system in accordance with some embodiments.

FIG. 6 is a block diagram of the processing system 100 of FIG. 1 performing a memory allocation for allocating the data structure 128 among the memories 106, 107, 108, 109 of the multiclass memory system 101 in accordance with some embodiments. In the illustrated embodiment, a library 620 provides an interface for software 624 to communicate memory locality information, preferences, and the like to the underlying system software (e.g., operating software (OS), hypervisor, etc.). That is, the library provides data structures, algorithms, and other services through an API 622, such that a programmer or other user may use function calls 602, 604 to indicate how an operating system 621 is to allocate the data structure 128 among the memories 106, 107, 108, 109 of the multiclass memory system 101. For example, in at least one embodiment, the API 622 includes a function call 602 for each memory 106, 107, 108, 109, each memory class (I, II), each memory level, or each memory type. The function call 602 comprises a memory indicator (depicted as "I-1") to indicate a memory allocation to memory 106. The function call 602 may further include parameters to indicate which data structure or other memory object is to be allocated to this memory 106, data size criteria, which memory (if the function call memory indicator indicates a memory class, level, or type rather than a specific memory), or the like.

In some embodiments, the API 622 includes a general memory allocation function call 604 that accepts parameters, including the data structure 128 (depicted as "DS" in function call 604) to be allocated and a memory indicator ("I-1") to indicate which memory 106 the data structure 128 is to be allocated to. In some embodiments, the memory indicator ("I-1) may indicate a memory class (I, II), multiple memories, multiple memory classes, or the like. Further, different embodiments may allow or require any of a number of parameters, for example, data structure type, data structure portions, allocation size limits, and the like. As illustrated, when the processor core 111 executes the software program 624 comprising either of the memory allocation function calls 602, 604, 606 to the library 620 via the API 622, the library 620 indicates that the operating system 621 is to allocate the data structure 128 to the memory 106 identified by the memory indicator ("I-1"). While the illustrated embodiment uses the standard C library "malloc" for the memory allocation function calls 602, 604, these techniques may easily be applied to other programming languages and their respective memory allocation interfaces as well. In some embodiments, a directive 606 or other annotation-like syntax is used to specify a memory allocation by specifying a particular memory or memory class directly to the compiler via a memory indicator. For example, in some embodiments, the directive 606 is processed by a compiler, and the information is passed to the library 620 or the operating system 621.

Different embodiments may employ different conventions for handling the allocations. For example, in some embodiments, memory allocation specified by the memory indicator of the function call 602, 604 or directive 606 is a strict requirements, such that if the indicated memory 106 does not have enough available memory space to satisfy the memory allocation request, the allocation would fail (e.g., a "NULL" pointer may be returned by the function calls 602, 604 with an "I-1" memory indicator). In other embodiments, the memory allocation specified by the function call 602, 604 or the directive 606 is treated more as a suggestion, such that if the indicated memory 106 does not have enough available memory space to satisfy the memory allocation request, the operating system 621 allocates the data structure 128 other than specified, for example, according to other heuristics, arbitrarily, or the like. In at least one embodiment, if the memory allocation specified by the function call or directive is not followed, the processing system 100 returns additional information to the programmer or other user regarding the actual allocation.

Some embodiments of the library 620 provide a "realloc" or "remap" function call that instructs (or suggests to) the OS that an existing allocation should be reallocated to a new level of memory (optionally resizing the size of the allocation at the same time). Variants may include an interface to allow subsets or regions of an existing memory allocation to be remapped. Further, some embodiments of the library 620 provide additional interface functions to help differentiate where an allocation came from. For example, in one embodiment, the function call "type whichMemory(ptr)" returns "I-1" if "ptr" is associated with a physical memory location in memory 106. In some embodiments, these memory allocation techniques are used in combination with Non-Uniform Memory Access (NUMA) based memory allocation schemes.

Figure 7:
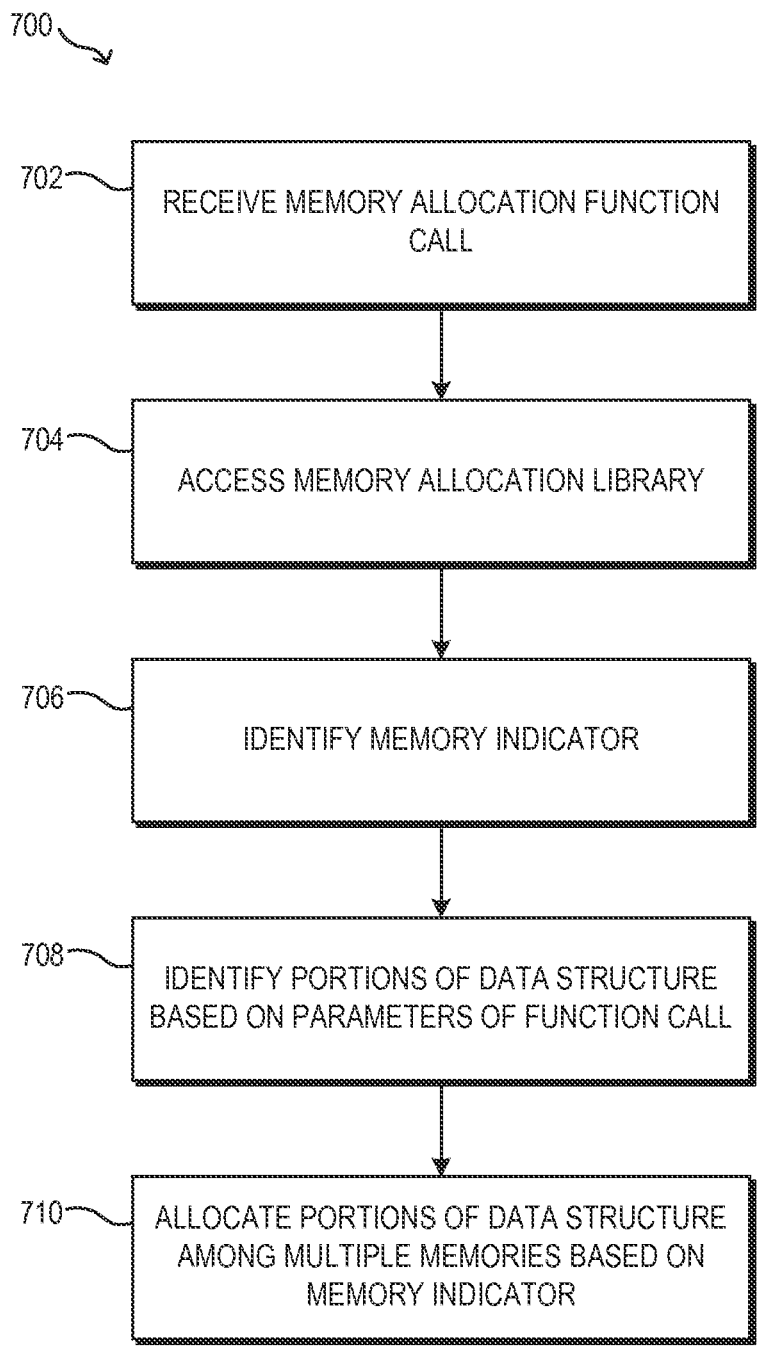
FIG. 7 is a flow diagram illustrating a method for memory allocation for a data structure among memories of a multiclass memory system in accordance with some embodiments.

FIG. 7 is a flow diagram illustrating an example method 700 for memory allocation for a data structure among memories of a multiclass memory system in accordance with some embodiments. For ease of reference, the method 700 is described below in the example context of the multiclass memory system 101 of FIG. 6. The method 700 initiates at block 702, whereby the processing system 100 receives the memory allocation function call 602, 604 when the processor core 111 executes the software program 624 comprising the memory allocation function call 602, 604 to the library 620 to allocate memory to a data structure 128.

At block 704, the processing system 100 accesses the library 620 via the API 622. The library 620 provides data structures, algorithms, and other services through the API 622 to the programmer or other user, such that it acts as an interface for the software 624 to communicate memory locality information, preferences, and the like to the underlying system software. As such, the library 620 facilitates a programmer or other user to specify memory allocation via the function calls.

At block 706, the processing system 100 identifies the memory indicator (depicted as "I-1" in FIG. 6) of the function call 602, 604 to determine the specified location for the allocation. For example, the memory indicator ("I-1") may specify one or more memories 106, 107, 108, 109, one or more classes (I, II), one or more memory levels, one or more memory types, or the like. The memory indicator ("I-1") may comprise a parameter passed via the function call, a syntax indicator separate from the function call, or the function call itself.

At block 708, the processing system 100 identifies portions of the data structure 128 based on parameters of the function call 126. In some embodiments, the parameter may specify the portions of the data structure 128 by identifying the type of the data structure 128, the boundaries of the portions, the data size of the portions, the data type for the portions, or the like. The data structure 128 may be divided into any number of data portions of any size, including a single portion representing the entire data structure 128.

At block 710, the operating system 621 allocates portions of the data structure 128 among multiple memories 106, 107, 108, 109 of the multiclass memory system 101 based on the memory indicator ("I-1"). For example, in response to the function call 604 comprising memory indicator "I-1" and parameter "DS," the operating system 621 allocates the entire data structure 128 to the first memory 106 of class I. In some embodiments the processing system 100 may treat the function call 602, 604, and its specified memory indicator "I-1" and parameters as a suggestion rather than a requirement. Generally, the method 700 facilitates efficient utilization of a multiclass memory system by allowing programmers or other users (including application software) to manage the allocation of data structures among the multiple memories of the multiclass memory system using function calls or directives comprising a memory indicator.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
responsive to a memory allocation function call to a library for allocating memory to a data structure in a multiclass memory system:
identifying, at a processor of the multiclass memory system, a type of the data structure; and
allocating, at the processor of the multiclass memory system and using the library, portions of the data structure among multiple memories of the multiclass memory system based on the type of the data structure.

2. The method of claim 1, wherein allocating portions of the data structure among multiple memories further comprises:
allocating metadata of the data structure to a first set of one or more memories of the multiple memories; and
allocating data of the data structure to a second set of one or more memories of the multiple memories.

3. The method of claim 2, wherein the one or more memories of the first set provide faster access than the one or more memories of the second set.

4. The method of claim 1, wherein:
the data structure comprises an ordered data structure; and
allocating portions of the ordered data structure comprises:
allocating an initial portion of the ordered data structure to a first set of one or more memories of the multiple memories; and
allocating a final portion of the ordered data structure to a second set of one or more memories of the multiple memories.

5. The method of claim 4, wherein:
the ordered data structure comprises a tree structure;
the initial portion of the ordered data structure comprises initial levels of nodes of the tree structure; and
the final portion of the ordered data structure comprises the final levels of nodes of the tree structure.

6. The method of claim 1, further comprising:
receiving, at the processor of the multiclass memory system, the function call via an application programmer interface (API).

7. The method of claim 1, wherein:
the memory allocation function call further comprises a plurality of parameters; and
allocating portions of the data structure among multiple memories of the multiclass memory system further comprises
allocating portions of the data structure among multiple memories of the multiclass memory system based on the plurality of parameters.

8. The method of claim 1, wherein:
the data structure comprises a linked list; and
allocating portions of the data structure among multiple memories of the multiclass memory system further comprises:
allocating an initial segment of the linked list to a first set of one or more memories of the multiple memories;
allocating a final segment of the linked list to a second set of one or more memories of the multiple memories; and
wherein the first set of one or more memories provides faster access than the second set of one or more memories.

9. The method of claim 1, wherein:
the data structure comprises a map structure; and
allocating portions of the data structure among multiple memories of the multiclass memory system further comprises:
  allocating a key portion of the map structure to a first set of one or more memories of the multiple memories;
  allocating a value portion of the map structure to a second set of one or more memories of the multiple memories; and
  wherein the first set of one or more memories provides faster access than the second set of one or more memories.

10. The method of claim 1, wherein:
the data structure comprises a graph structure; and
allocating portions of the data structure among multiple memories of the multiclass memory system further comprises:
  allocating node metadata of the graph structure to a first set of one or more memories of the multiple memories
  allocating node data portions of the graph structure to a second set of one or more memories of the multiple memories; and
  wherein the first set of one or more memories provides faster access than the second set of one or more memories.

11. A system comprising:
a library store to store a library; and
a processor coupleable to a plurality of memories sharing a unified memory address space, the processor to:
  responsive to a memory allocation function call to the library for allocating memory to a data structure:
    identify a type of the data structure; and
    allocate, using the library, portions of the data structure among multiple memories of the plurality of memories based on the type of the data structure.

12. The system of claim 11, wherein the processor is to allocate portions of the data structure among multiple memories by:
  allocating metadata of the data structure to a first set of one or more of the multiple memories; and
  allocating data of the data structure to a second set of one or more of the multiple memories.

13. The system of claim 12, wherein the one or more memories of the first set provides faster access than the one or more memories of the second set.

14. The system of claim 11, wherein the processor is further to:
  receive the function call via an application programmer interface (API).

15. The system of claim 11, wherein:
the memory allocation function call further comprises a plurality of parameters; and
the processor is to allocate portions of the data structure among multiple memories of the plurality of memories by allocating portions of the data structure among multiple memories of the plurality of memories based on the plurality of parameters.

16. The system of claim 11, wherein:
the data structure comprises a linked list; and
the processor is to allocate portions of the data structure among multiple memories of the plurality of memories by:
  allocating an initial segment of the linked list to a first set of one or more memories of the multiple memories;
  allocating a final segment of the linked list to a second set of one or more memories of the multiple memories; and
  wherein the first set of one or more memories provides faster access than the second set of one or more memories.

17. The system of claim 11, wherein:
the data structure comprises a map structure; and
the processor is to allocate portions of the data structure among multiple memories of the plurality of memories by:
  allocating a key portion of the map structure to a first set of one or more memories of the multiple memories;
  allocating a value portion of the map structure to a second set of one or more memories of the multiple memories; and
  wherein the first set of one or more memories provides faster access than the second set of one or more memories.

18. The system of claim 11, wherein:
the data structure comprises a graph structure; and
the processor is to allocate portions of the data structure among multiple memories of the plurality of memories by:
  allocating node metadata of the graph structure to a first set of one or more memories of the multiple memories;
  allocating node data portions of the graph structure to a second set of one or more memories of the multiple memories; and
  wherein the first set of one or more memories provides faster access than the second set of one or more memories.

\* \* \* \* \*